United States Patent [19]

Olbert

[11] 4,098,032
[45] Jul. 4, 1978

[54] METHOD OF FORMING AIR BEARING RAILS OF HEAD ASSEMBLIES

[75] Inventor: Manfred Olbert, Gau-Bischofsheim, Fed. Rep. of Germany

[73] Assignee: International Business Machines Corporation, Armonk, N.Y.

[21] Appl. No.: 623,707

[22] Filed: Oct. 20, 1975

[51] Int. Cl.² .............................................. B24B 1/00
[52] U.S. Cl. ...................................... 51/326; 51/328; 125/16 R
[58] Field of Search ................... 29/603; 51/151, 157, 51/281 R, 286, 359, 361, 371, 372, 283, 206 P, 326, 357, 328; 125/12, 16 R, 21

[56] References Cited

U.S. PATENT DOCUMENTS

| 1,307,577 | 6/1919 | Chapman | 51/157 |
| 3,478,732 | 11/1969 | Clark | 125/12 |
| 3,550,264 | 12/1970 | Bouwma | 29/603 |
| 3,823,416 | 7/1974 | Warner | 360/122 |
| 4,011,692 | 3/1977 | Bos | 51/206 P X |

FOREIGN PATENT DOCUMENTS 83,010 4/1919 Switzerland ................... 51/206 P

OTHER PUBLICATIONS

IBM Technical Disclosure Bulletin "Multistring Cutting and Dicing Machine" by J. Gandia et al., vol. 11, No. 10, Mar. 1969, p. 1262.

*Primary Examiner*—Gary L. Smith
*Attorney, Agent, or Firm*—James A. Pershon

[57] ABSTRACT

A plurality of parallel abrasive wires are placed into a plurality of grooves machined into a support. The depth and spacing of the grooves form a wire pattern which shapes the air bearing rails of sliders of magnetic head assemblies. Batch fabrication is accomplished by providing relative motion between the wires and a block of material suitable for sliders and cut to size to form a row of sliders. The wires abrade the row to shape the width and spacing of the air bearing rails according to the spacing of the grooves in the support.

2 Claims, 5 Drawing Figures

METHOD OF FORMING AIR BEARING RAILS OF HEAD ASSEMBLIES

BACKGROUND OF THE INVENTION

This invention relates generally to a process for making a head mounting for a transducer adapted to record or reproduce an electrical signal from a moving magnetic recording medium and more specifically to a method of batch fabrication of a slider assembly for mounting a transducer thereon for flying the transducer on a fluid bearing between a record carrier and the slider head assembly.

FIELD OF THE INVENTION

Magnetic head assemblies that fly relative to magnetic media have been used extensively. The objectives for improving the non-contact transducing relationship between a magnetic transducer and a magnetic recording medium, such as a rotating disk, are to obtain very close spacing between the transducer and the disk and to maintain a stable, constant spacing. The close spacing, when used with very narrow transducing gaps and very thin magnetic recording films, allows short wavelength, high frequency signals to be recorded. For reliable writing and sensing of data information, the transducer must be closely spaced to the magnetic media and this close spacing must be kept as constant as possible around the entire disk surface.

The closer the magnetic transducer is positioned with respect to the moving recording surface, the more difficult it becomes to control the mechanical tolerances of the structure supporting the recording head. To overcome these mechanical difficulties, magnetic recording and reading transducers are placed in assemblies commonly known as sliders, adapted for floating or flying on a thin film of air caused by the moving magnetic recording surface.

The slider generally includes a plane bearing surface which lies substantially parallel to the rapidly moving magnetic recording surface and is separated therefrom by a thin film of air. Along the leading edge of the plane bearing surface there is a stabilizing bearing surface disposed at a slight angle relative to the plane bearing surface. To accomplish an even closer spacing between the assembly and the moving magnetic media, the plane bearing surface includes a plurality of rails running parallel to the movement between the assembly and the media. The advantages of rails rather than using the entire slider body for flying is disclosed in U.S. Pat. No. 3,823,416, issued to M. W. Warner on July 9, 1974 and assigned to the assignee of the present invention. The rails provide the air bearing surface which supports the assembly on the air bearing. Thus in order to precisely locate the transducers at a precise flying height, the rails must be formed having extremely close tolerances and must be void of chipped areas.

DESCRIPTION OF THE PRIOR ART

In the prior art method of manufacturing the slider rails, the block of slider materials was serrated to remove a section to define the rails. Since the sliders are generally made of a very hard non-porous material, the cuts were generally made with a diamond-embedded saw. The rails were made oversized since the cutting produced chipped edges. The rails had to be made oversized so that the chipped areas can be removed. A reliable flying height could not be determined if the haphazard, chipping remained on the rails.

The hard material generally used for slider elements together with the close tolerances and smooth edge conditioning, required extremely delicate grinding operations. As discussed and shown in U.S. Pat. No. 3,823,416, the edges of the rails are beveled to accurately control the center rail width and the area of the air bearing surface. A step and repeat machining operation was used to cut the rails oversized and then used to bevel the rails to the exact width required. The bevel forming grinding tool had to be closely checked because, as the tool wore from the grinding operation, the width of the rails likewise changed. With the prior art method of forming the rails two steps were required, first cutting oversized and then bevel grinding down to the actual required rail width.

It is, therefore, an object of the present invention to provide a method of manufacturing slider air bearing rails to a precise width and depth in lesser steps than formerly required.

Further it was extremely difficult to fabricate a plurality of sliders at one time. The grinding wheel would wear, forcing rechecks and readjustments to keep the active rail width within the extremely tight tolerances required. Essentially each slider had to be individually ground and lapped in a step and repeat operation to provide any quality control.

Another object of this invention, therefore, is to provide a head assembly wherein the slider air bearing rails can be batch fabricated to form a plurality of sliders in one operation.

SUMMARY OF THE INVENTION

In accordance with the present invention, a method of manufacturing slider rails for a transducer head assembly incorporates placing a sized block of slider material against a plurality of abrasive wires supported by grooves precision machined into a holder. The spacing of the wires and grooves defines the distance between the rails and the rail width. A plurality of grooves can be formed into one holder and thus the block of slider material can be sized such that one block forms a row of slider elements thereby permitting the batch fabrication of sliders. The row of slider elements is placed into contact with the abrasive wires and moved relative thereto to shape the rails. The movement is stopped when the slider rail edge is conditioned.

In the present invention, the lapping tool incorporates the steps of precision machining a plurality of grooves on a hardened block of material with the distance between the grooves defining the distance between the rails of each slider element in the plurality of elements being batch fabricated, and placing one wire in each of the grooves with the wire shape and size, and the shape and depth of the groove determining the height of the slider rail. The wires are drawn taut in each groove. An abrasive slurry is provided if the wires are not normally abrasive. To complete the process to manufacture the slider rails, the block of slider elements is placed in contact with the slurry covered wires and moved relative to the wires to shape the rails. The movement is stopped when the slider rail edge is conditioned. This occurs when the slider rail width is reached according to the wire size, depth of groove and spacing between grooves. The relative movement can be stoppped when the slider body contacts the face of the grooved support or, in the case of a prepolished slider rail surface, motion can be stopped prior to the slider body touching the face of the grooved support, thus preserving the prepolished surface from damage.

The parallel suspended wires machine the slider rails to the required dimensions. The material removal results from a lapping action similar to a wire saw. The operation can be repeated on the same grooved wire support since the wire wear is on the side that contacts the slider material and the distance between rails has the least wear on the wires. When the wires are worn to below the required tolerance, they are replaced by new wires and the process continues. The groove pattern in the wire support or holder is established once to achieve a plurality of fabricated parts.

An object of the present invention, therefore, is to provide an enhanced method of manufacturing a head assembly slider rails.

Another object of this invention is to provide a method of manufacturing slider rails by the use of a cutting or shaping tool that is simple to fabricate and inexpensive to manufacture.

Yet another object of the present invention is to provide a method of manufacturing air bearing slider rails of magnetic head assemblies that provides precision rails with a higher accuracy, better repeatability and smoother, chip free rail edges.

Still another object is to provide a method of manufacturing slider rails of magnetic head assemblies that batch fabricates slider rails using abrasive wires supported in a grooved supporting block.

These and other objects of the present invention will become apparent to those skilled in the art as the description proceeds.

BRIEF DESCRIPTION OF THE DRAWINGS

The various novel features of this invention along with the foregoing and other objects, as well as the invention itself both as to its organization and method of operation, may be more fully understood from the following description of an illustrated embodiment when read in conjunction with the accompanying drawing, wherein.

DESCRIPTION OF A PREFERRED EMBODIMENT

Figure 1:
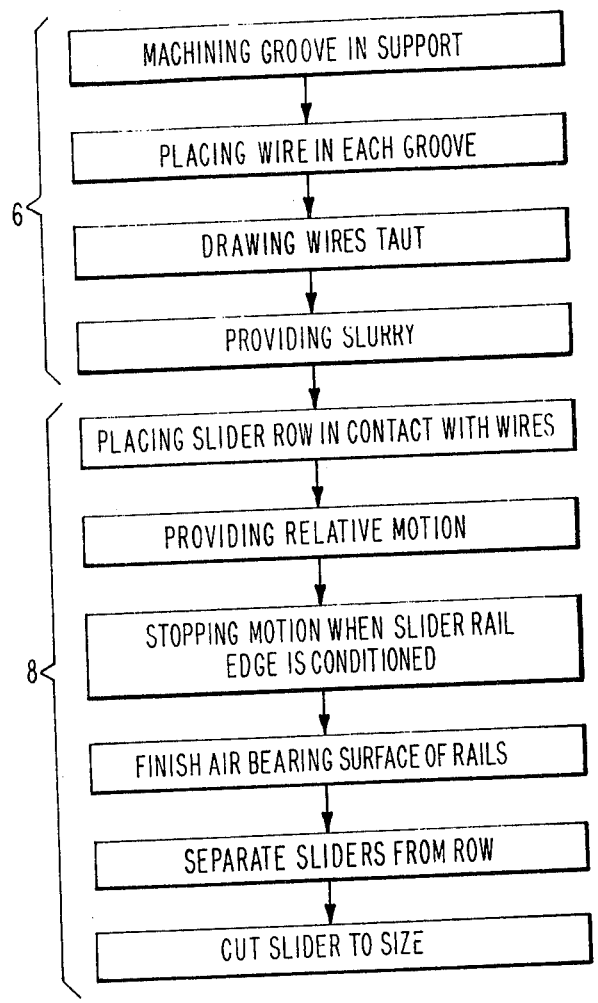
FIG. 1 is a flow diagram of the process method for manufacturing a slider according to the present invention.
Figure 2:
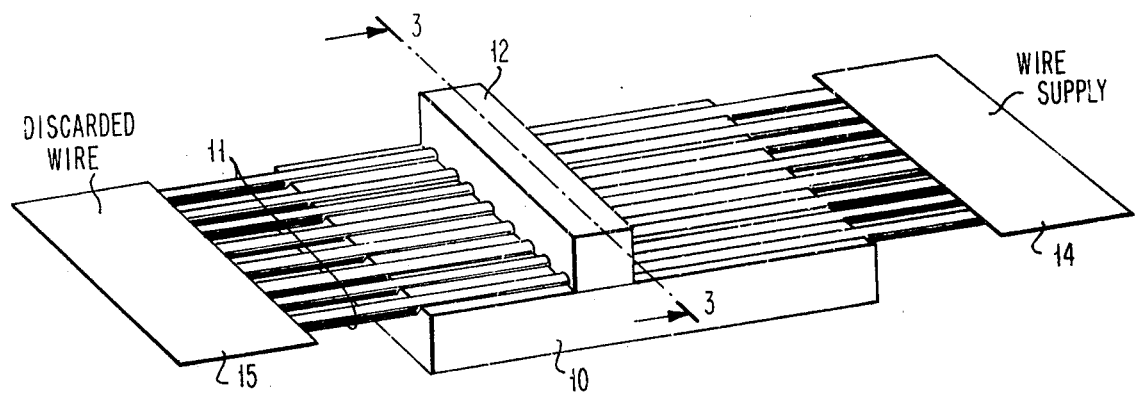
FIG. 2 is an isometric and block diagram of relevant apparatus for performing the method according to FIG. 1.

Referring to FIGS. 1 and 2, the method of manufacturing according to the present invention can be broken down into two groups. The first steps identified by the numeral 6 provide a grooved wire support or holder block 10 and wires 11 in the block 10 which is then used to lap a slider block 12 to form the rails. The second group of method steps identified by the numeral 8 shows the steps required to take the block 12 of slider material and end with a plurality of sliders with formed air bearing rails. The complete steps are shown in FIG. 1. It should be evident that the actual method for manufacturing a slider according to the present invention starts from the fifth step shown in FIG. 1 using a tool manufactured according to the first four steps.

Figure 3:
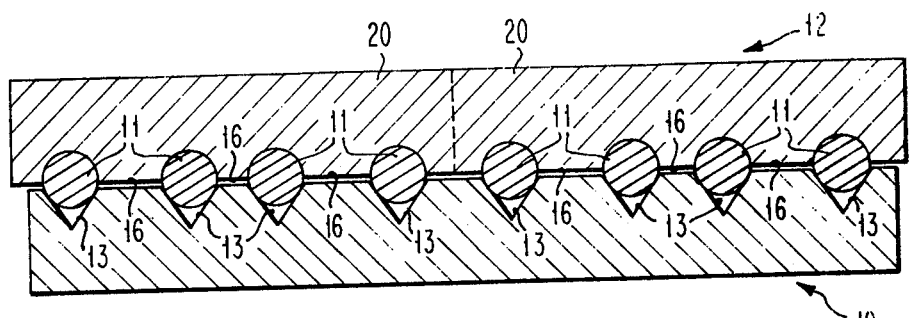
FIG. 3 is a cross sectional view taken across plane 3—3 of 2.

The manufacture of the tool for forming the rails in the sliders starts by machining a plurality of grooves 13 (FIG. 3) in the block 10 to be used as the wire support. The block 10 is typically made of brass, but any stable material may be used. The next step is placing the wire 11 in each of the grooves 13 machined in the wire support block 10. The wire 11 can be made at any solid stiff wire such as hard copper beryllium. The distance between the grooves 13 and the size of the wire 11 determines the width and spacing of the slider rails 16. Also the type and size of the wire determines the depth of the cut into the slider material and thus the height of the rail. This is shown in FIG. 3 and will be discussed later together with FIG. 3.

In the preferred embodiment of the present invention, the grooves in the wire support are V-shaped and the wires are essentially round. The shape of the cutout in the slider is therefore essentially a semicircle. It will become apparent that other groove shapes could be machined such as semicircular, again for use with a round wire, or square or multisided to fit either similarly shaped or round wires. The shape of the cutout section is used to bleed off the air around the rails and does not contribute to the air bearing surface. The only critical dimensions are the width and spacing of the rails as determined by the wire surface at the top of the groove. Any shape of the cutout is permissible since its shape does not affect the operation of the slider. The purpose of the groove is to support and hold the wire and thus any shape accomplishing that purpose is usable in the present invention. Therefore, although the preferred embodiment is directed to a V-shaped groove and a round wire, the invention should not be limited to these shapes.

Referring to FIGS. 1 and 2 in continuing the flow, the wires 11 are drawn taut in the grooves 13 across the wire support block 10 from a wire supply 14 to a means for holding the used or discarded wire such as a spool 15. Then the slurry is provided across the wires. If non-abrasive wires are used as preferred, an abrasive slurry is required to provide the lapping action. However, abrasive wires could be used according to the present invention and the slurry, in turn, will be a lubricant and a coolant for the lapping process. The slurry can be provided though openings in the wire support block 10, for instance, to distribute the slurry over the length of the wires 11 contacting the grooves 13 in the block 10.

The block 12 of slider material comprising a row of slider elements is then placed in contact with the wires 11. Preferably, the slider block 12 is moved parallel to the length of the wires back and forth across the wire support block 10. The relative motion between the slider elements and the wires provides a lapping or grinding action which removes material from the slider elements. It is evident that only relative motion between the row of sliders and the wires is required and therefore the slider block 12 may be secured and the wires 11 and wire support block 10 moved parallel to the wire lengths to provide the lapping action. The lapping action continues until the slider rail edge is conditioned to the size required as is shown in FIG. 3.

Figure 5:
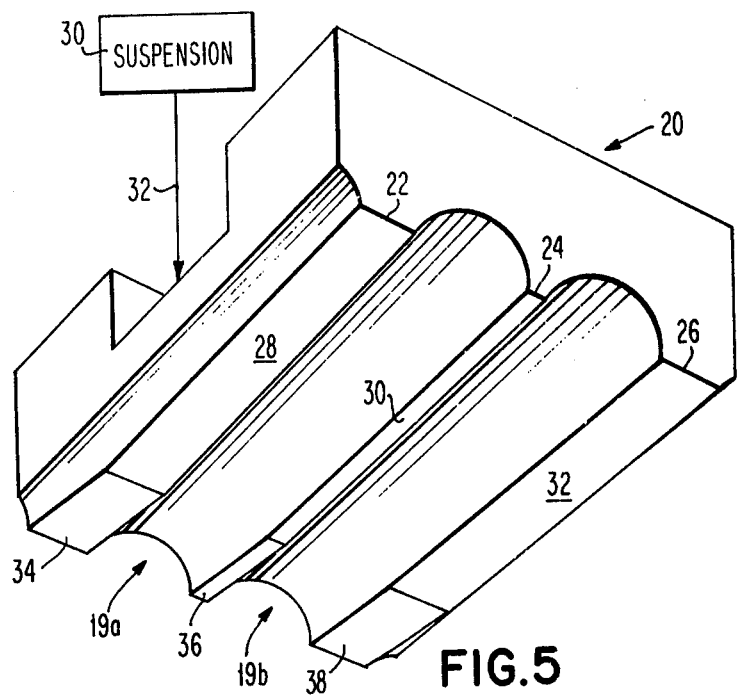
FIG. 5 is an orthogonal view of a slider assembly manufactured according to the method disclosed in FIG. 1.

At this time rails 16 of the plurality or block of slider elements forming the row are precisely formed relative to each other. All that remains to prepare the slider elements 20 for affixing a transducer to the slider 20 is to finish the air bearing surface of the rails 16, separate the slider elements from the slider block 12 into individual elements, and cut the sliders to size. A taper flat or other sliding height control means provides the finishing step to the air bearing surface of the rails as shown in FIG. 5.

The advantages of the present invention is that the most important measurement, the width of the slider rails, remains within extremely close tolerances even though the wires wear during the lapping process. Referring to FIG. 3, as the slider element block 12 is drawn parallel to the wires 11, the top most section of the exposed wires wears as the slider block is drawn parallel to the wires. The side surface 17 of the wires 11 immediately next to the wire support grooves contact the slider block last and for only a relatively short time, see FIG. 4. These surfaces 17 therefore wear the least. The top most exposed portion 18 of the wire 11 will wear first since most of the lapping action is performed by this section. The side surface 17 of the wires 11 at the edge of the grooves 13 determine the most important dimensions of the slider 20, the width and spacing of the rails 16. The dimensions of the bleed slots 19a and 19b are determined by the top portion 18 of the wire and this dimension has a relatively wide size tolerance compared to the width of the rails. Thus the wear of the wires is in the dimensions of the least tolerance requirement and the wires can be replaced before the rail edge tolerance is reached.

Figure 4:
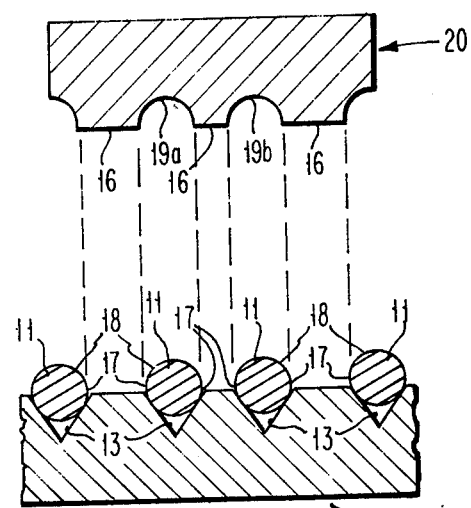
FIG. 4 is a cross sectional view of a slider after completion according to the method of manufacturing as shown in FIG. 1.

Referring to FIG. 4, the longitudinal bleed slots 19 between the rails 16 permit air flow within a defined region under the slider body. The downwardly depending longitudinal rails, laterally spaced, define the flying height and pressure required to maintain the height. The bottom surfaces of the rails substantially form the entire air bearing surface. The bleed slots 19 can have a wide tolerance in their depth and can be of almost any shape and curvature. Therefore, the top of the wire can wear without affecting the important dimension, the width and spacing of the slider rail. The wires have a long life and can be replaced easily after the top surface wear is observed without affecting the rail widths.

Forming the slider rail according to the present invention further provides a lower cost and permits the batch fabrication of slider elements. In FIG. 3, two sliders 20 are shown being lapped by the wires supported in the V-grooved wire support block 10, but it is evident that the slider block 12 or row of sliders can comprise many more sliders 20 by providing a larger wire support block 10 with more grooves 13 machined therein and more wires 11 supported in the grooves to form a plurality of rails at the same time. One operation, the lapping parallel to the wires, provides the rail widths. Beveling is not required to remove the chipped surface which occurs when the rails are rough sized by diamond saws. Lapping with the wires provides a very gentle lapping action and edge chipping of the rails does not occur.

A slider element 20 that can be manufactured to the method steps of the present invention is shown in FIG. 5. The advantages of the slider element as shown in FIG. 5 is described in the aforementioned patent U.S. Pat. No. 3,823,416. The slider element 20 includes a magnetic transducer element (not shown) to form a magnetic transducer assembly. A suspension system illustrated diagrammatically as 30 is attached to the slider element for maintaining the assembly in position on or above an associated magnetic surface. The slider element assembly is urged towards the magnetic surface by a load means illustrated diagrammatically as 32 and associated with the suspension system 30.

The unitary magnetic slider body 20 is preferably formed from ferrite material and includes three downwardly dependent longitudinal rails 22, 24 and 26 (represented by the numeral 16 in FIGS. 3 and 4) that are parallel to and coplanar with one another. Each rail has a taper-flat profile with a respective flat portions 28, 30 and 32 occurring in back of the leading edge taper portions 34, 36 and 38, respectively. The outside rails 22 and 26 are located at the outer extremities of the slider body and are wider than the width of the center rail 30 so as to provide substantially the entire air bearing surface. The three rails are separated by bleed slots 19a and 19b which provide paths for undesired air to bleed off from the air bearing surfaces during operation, without contributing to the effective air bearing surface of the slider or affecting its flying height.

The slider element assembly with the three longitudinal rails that are laterally spaced apart requires only a low loading force to consistently maintain a flying height of only several microinches. This low flying height and the tolerances required for the low flying height and a stable pitch and roll requires that the dimensions of the rails 22 and 26 especially be maintained within extremely close tolerances. In this slider, the length of the body is 0.25 inches and the total body width is 0.150 inches. The outside rails are 0.025 inches wide and the center rail is 0.005 inches wide. For this embodiment a 15 mil wire is preferred for the lapping process with the V-grooves formed having a depth of between 7 to 8 mils.

The principles of the present invention have now been made clear in an illustrative embodiment. There will be immediately obvious to those skilled in the art many modifications of structure, arrangement, proportions, the elements, materials and components used in the practice of the invention. For instance, the slider element according to the embodiment shown includes three rails with the outer two wider than the center rail. It is obvious that any number of rails can be provided varying in width. The dimensions of the rails and numbers thereof can be controlled by the placement of the grooves in the wire support block. Further, the center rail shown in the figures can be removed by a further grinding process without affecting the spirit of the present invention which is the precise positioning and dimension control of slider element rails. Also, it is evident that many different materials are usable for the slider elements and the use of ferrite for the sliders and the other materials for the wires and the grooved wire support block is merely illustrative. The appended claims are therefore intended to cover and embrace any such modification, within the limits only of the true spirit and scope of the invention.

I claim:

1. A method of forming precision air bearing rails on a slider element for determining the air bearing flying height between a head assembly and a magnetic media as a result of relative motion therebetween, said method comprising the steps of:

(a) placing at least one slider element in contact with a plurality of abrasive parallel wires drawn taut in longitudinal V shaped grooves precision machined in a flat support surface, the distance between the grooves defining the thickness and separation between the rails of the slider element and the diameter and shape of the wires and the depth of the groove determining the shape and depth of bleed slots in the slider element, said wires supplied from a source mounted at one end of the support surfaces and taken up by a spool mounted at the other end of the support surface;

(b) providing a back and forth relative motion between the grooved support with the wires and the slider element in a direction parallel to said wires; and (c) stopping the motion when the slider element rail edge is conditioned according to predetermined dimensions.

2. A method of forming a slider element having precision air bearing rails by the use of a grooved longitudinal flat support surface having wires placed in each groove and supported at the ends of the support surface, the distance between the grooves defining the width and distance between the rails of each slider element and the diameter and shape of the wires and the depth of the groove determining the shape and depth of bleed slots in the slider element, said method comprising the steps of:

providing a slurry in said grooves to contact said wires;

placing a block of slider materials sized to comprise at least one row of slider elements in contact with said slurry covered wires;

providing a back and forth relative motion between the grooved support surface with the wires and the row of slider elements in a direction parallel to said wires;

stopping the motion when the rails edges of the slider elements are conditioned according to predetermined dimensions;

finishing the air bearing surface of the rails of the slider elements;

separating the slider elements from the row of slider elements; and cutting each slider element to the required size and shape.

* * * * *